United States Patent [19]

Adams

[11] 4,292,502
[45] Sep. 29, 1981

[54] HELICOPTER DEICER CONTROL SYSTEM

[75] Inventor: Lowell J. Adams, Tallmadge, Ohio

[73] Assignee: The B.F. Goodrich Company, Akron, Ohio

[21] Appl. No.: 9,636

[22] Filed: Feb. 5, 1979

[51] Int. Cl.³ .............................................. H05B 3/02
[52] U.S. Cl. .................................. 219/483; 219/486;
  219/493; 219/202; 219/506; 307/39; 307/41;
  244/134 D; 244/134 R
[58] Field of Search ............... 219/501, 483, 492, 486,
  219/493, 201, 203, 501, 205, 506, 487; 244/134
  D, 134 R, 134 C; 307/39–41

[56]         References Cited
      U.S. PATENT DOCUMENTS

| 3,002,718 | 10/1961 | Hackenberger, Jr. | 244/134 R |
| 3,183,975 | 5/1965 | Keen | 244/134 R |
| 3,420,476 | 1/1969 | Volkner et al. | 244/134 D |
| 3,657,514 | 4/1972 | Adams | 244/134 D |
| 3,984,699 | 10/1976 | Baily | 307/41 |
| 4,010,412 | 3/1977 | Forman | 219/486 |
| 4,036,457 | 7/1977 | Volkner et al. | 244/134 D |

FOREIGN PATENT DOCUMENTS 840509 7/1960 United Kingdom ........... 244/134 D

Primary Examiner—C. L. Albritton
Assistant Examiner—M. Paschall
Attorney, Agent, or Firm—Harry F. Pepper, Jr.

[57]         ABSTRACT

A helicopter deicing control system (10) is provided for selectively distributing D.C. electrical power to a plurality of deicing segments (80, 90) on main and tail rotor blades with only two slip-ring assemblies (60 and 61, 62 and 63) for each rotor drive shaft. A power distribution controller (20) receives electrical power from the helicopter's onboard, fixed electrical power system and provides an output signal including power and control D.C. electrical signals of opposite polarities. A distributor (70) receives the output signal from controller (20) and increments a rotary switch (74) upon receipt of a D.C. electrical control signal, and distributes power to the main rotor deicing segment (90) connected to the rotary switch (74) contact then engaged upon the receipt of a D.C. electrical power signal so as to sequentially deliver D.C. electrical power to the desired main rotor deicing segment.

Controller (30) includes provisions for individually preselecting the operating time for each deicing segment (80, 90), testing the operation and providing a continuous visual indication of the operational status of deicing control system (10).

17 Claims, 9 Drawing Figures

HELICOPTER DEICER CONTROL SYSTEM

TECHNICAL FIELD

The present invention relates generally to a device for selectively distributing electrical power to a plurality of electrical load elements on at least one rotating member. More specifically, the present invention pertains to a device for sequentially distributing electrical power to a plurality of electrically heated deicing elements in aircraft propeller or helicopter rotor blade deicing systems. In particular, the present invention relates to a device for sequentially and cyclically distributing D.C. electrical power to a plurality of deicing elements on helicopter rotor blades with a minimum number of electrical connections between the helicopter's electrical power generating system and the rapidly rotating main and tail rotor blades.

BACKGROUND ART

Aircraft deicing systems are well-known and widely used saftey devices for the removal of ice accumulated on aerodynamically significant aircraft surfaces, such as propeller and helicopter rotor blade airfoils. It has been found that cycling the application of heat to the airfoil radially outwardly from root to tip of a rotating airfoil results in substantially improved ice shedding characteristics with significantly reduced energy requirements. Accordingly, most present-day aircraft deicing systems incorporate a plurality of electrical resistance-type heating elements, known as deicing segments, which are sequentially and cyclically energized in symmetrical pairs on opposing blades.

In order to selectively energize each deicing segment, a separate electrical connection was necessary for each opposing pair of deicing segments and a single additional electrical connection, common to all deicing segments, was required to complete each two-wire deicing segment circuit. Unfortunately, the energy requirements of these deicing segments are such that power must be obtained from one of the electrical power generator's located elsewhere on the aircraft. Thus, some mechanism is required for coupling the power from the aircraft's fixed generating system to the rapidly rotating propeller or rotor blades. Heretofore a suitable plurality of brush block assemblies were rigidly mounted to the aircraft, and slip-ring assemblies positioned on the rotating propeller or rotor drive shaft to effectuate this coupling. For example, in a helicopter with six deicing segments on each of four main rotor blades and a single deicing segment on each of two tail rotor blades, provided pairs of segments on opposing blades are simultaneously energized, a total of 13 slip-ring asssemblies for the main rotor blades and 2 slip-ring assemblies for the tail rotor blades were required. However, such assemblies are subject to substantial wear, require frequent maintenance and replacement and, because of the large number of assemblies required, present a constant threat of in-flight deicing system failure.

I am specifically aware of only one other control system for the cyclic distribution of D.C. electrical power to deicer elements on rotating propeller blades in which the number of required slip-ring assemblies is minimized, my previous invention, U.S. Pat. No. 3,657,514. However, the nature of that control system is such that its use is limited to selectively controlling only two sets of deicing segments, unlike the unlimited number that may be selectively controlled by the present invention, as detailed hereinafter.

Other deficiencies of the prior art deicing systems includes the inability to provide rapid testing of the deicing system when the aircraft is resting on land (and air cooling capabilities are limited), continual visual monitoring of the deicing system operational status, and a simple mechanism for the adjustment of deicer segment heating cycle times.

DISCLOSURE OF INVENTION

It is, therefore, an object of the invention to provide a device for the selective distribution of electrical power to a plurality of load elements on at least one rotating member, the device having a minimum number of means with which to selectively distribute power to each load element. More particularly, it is an object of the invention to provide a device for sequentially distributing electrical power to a plurality of load elements on at least one rotating member with a minimum number of conducting assemblies, preferably just two for each rotating member.

It is another object of the invention to provide a device, as set forth above, for sequentially distributing D.C. electrical power to a plurality of deicing segments on a plurality of rotating airfoils with only two slip-ring assemblies for each group of rotating airfoils.

It is still another object of the invention to provide a device, as set forth above, in which an electrical parameter of the electrical power signal, such as the polarity of a D.C. electrical power signal, is varied to send command information for directing the selection of a desired deicing segment so that electrical power may be delivered to the desired deicing segment.

It is yet another object of the invention to provide a device, as set forth above, in which the electrical parameter is varied between two states, such as positive and negative polarity in a D.C. electrical power signal, and in which a distributor is provided that can distinguish between such states and can sequentially select the desired deicing segment and energize the same upon receipt of a signal having the appropriate state.

It is a further object of the invention to provide a device, as set forth above, which may rapidly test and thereby verify the proper operation of the entire deicing system, may provide for continual visual monitoring of the deicing system's operational status, and may provide a simple mechanism for the adjustment of deicer segment heating cycle times.

These and other objects and advantages of the present invention over existing prior art forms will become more apparent and fully understood from the following description in conjunction with the accompanying drawings.

In general, a device embodying the concept of the present invention for distributing electrical power to a plurality of load elements on at least one rotating member includes a source of electrical power, a power distribution controller connected to the source of electrical power and providing an output signal having an electrical parameter variable between at least two distinguishable states, and a distributor rotating with the rotating member for receiving the output signal from the power distribution controller and distinguishing between the states of its output signal and selectively distributing the electrical power to the desired load elements.

BRIEF DESCRIPTION OF THE DRAWINGS

FIG. 7 illustrates an alternative main rotor synchronization and power distributor suitable for use with the present invention.

FIGS. 8 and 9 are coordinated in time, although they are not necessarily to scale or otherwise coordinated.

PREFERRED EMBODIMENT FOR CARRYING OUT THE INVENTION

Figures 1, 6:
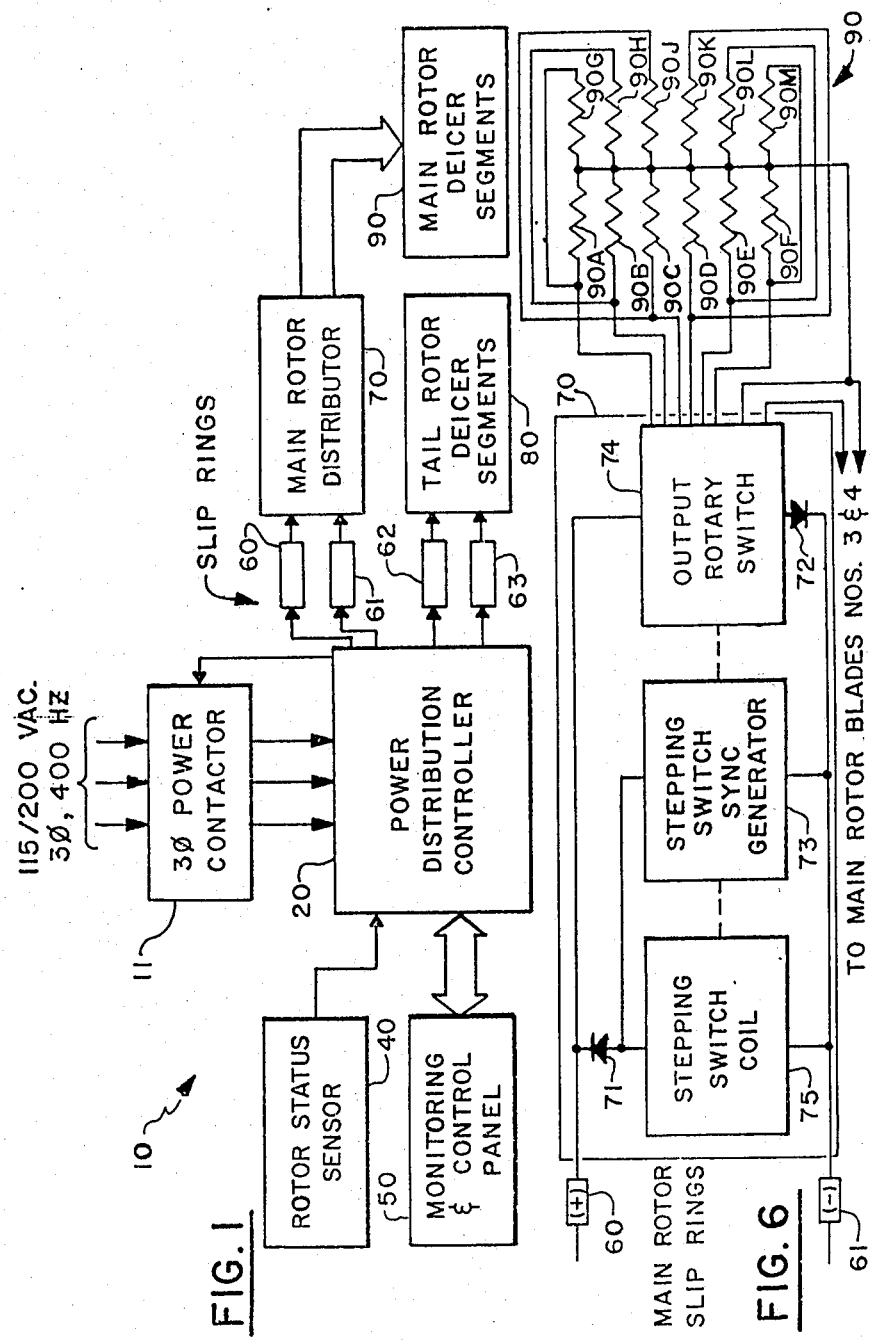
FIG. 1 is a block diagram of an exemplary device according to the concept of the present invention.
FIG. 6 is a more detailed block diagram of the main rotor synchronization and power distributor shown in FIG. 1 and further depicts a portion of the main rotor blades deicing segments.

FIG. 1 depicts a device, generally indicated by the numeral 10, for the selective distribution of electrical power to a plurality of load elements on at least one rotating member. Merely for purposes of illustration, and not by way of limitation, device 10 is disclosed herein for use with and control of a helicopter deicing system in which there exists six deicing segments on each of four main rotor blades and one deicing segment on each of two tail rotor blades.

Device 10 receives electrical power from an external supply source which, in the example to be utilized herein, may be a conventional 115/200 V.A.C., three phase, 400 Hz electrical power generation system fixed onboard the helicopter and passed through a conventional three phase contactor 11 to a power distribution controller 20. As further detailed hereinbelow, power distribution controller 20, which will hereinafter be referred to as "controller 20," also receives various input and control selection information from rotor status sensor 40 and monitoring and control panel 50, and generally controls deicing segment energization for both normal operation and testing purposes. More particularly, controller 20 generates command information for directing the selection of the desired deicing segment, and appropriately distributes both the command information and suitable electric power for the deicing segments, via suitable signal transfer conductors such as slip-ring assemblies 60 and 61, to main rotor distributor 70, and, via suitable signal transfer conductors such as slip-ring assemblies 62 and 63, to tail rotor deicing segments 80. Main rotor distributor 70 in turn selectively distributes the electrical power to the desired main rotor deicing segments 90. Because there are only two tail rotor deicing segments, they are simultaneously energized in sequence with that of the main rotor deicing segments making a tail rotor distributor unnecessary in the present example.

Figure 2:
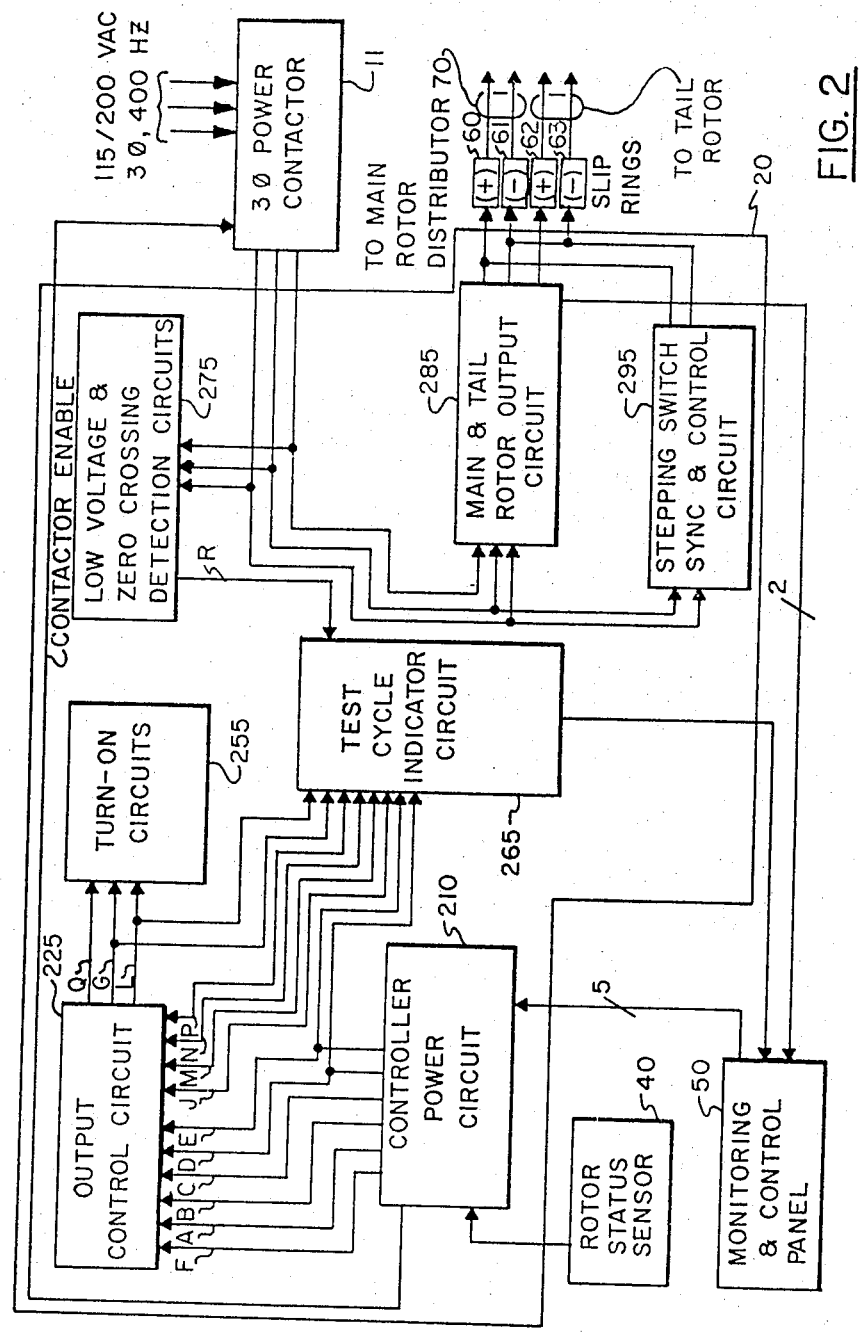
FIG. 2 is a more detailed block diagram of the power distribution controller, the monitoring and control panel, and the rotor status sensor shown in FIG. 1.

Controller 20 may be seen in FIG. 2 to include the following, each of whose functions shall be delineated further hereinafter: Controller power circuit 210; output control circuit 225; turn-on circuits 255; test cycle indicator circuit 265; low voltage and zero crossing detection circuits 275, referred to hereinafter as "detection circuit 275"; main and tail rotor output circuits 285; and, stepping switch synchronization and control circuit 295, known hereinbelow as "sync circuit 295".

Figure 3:
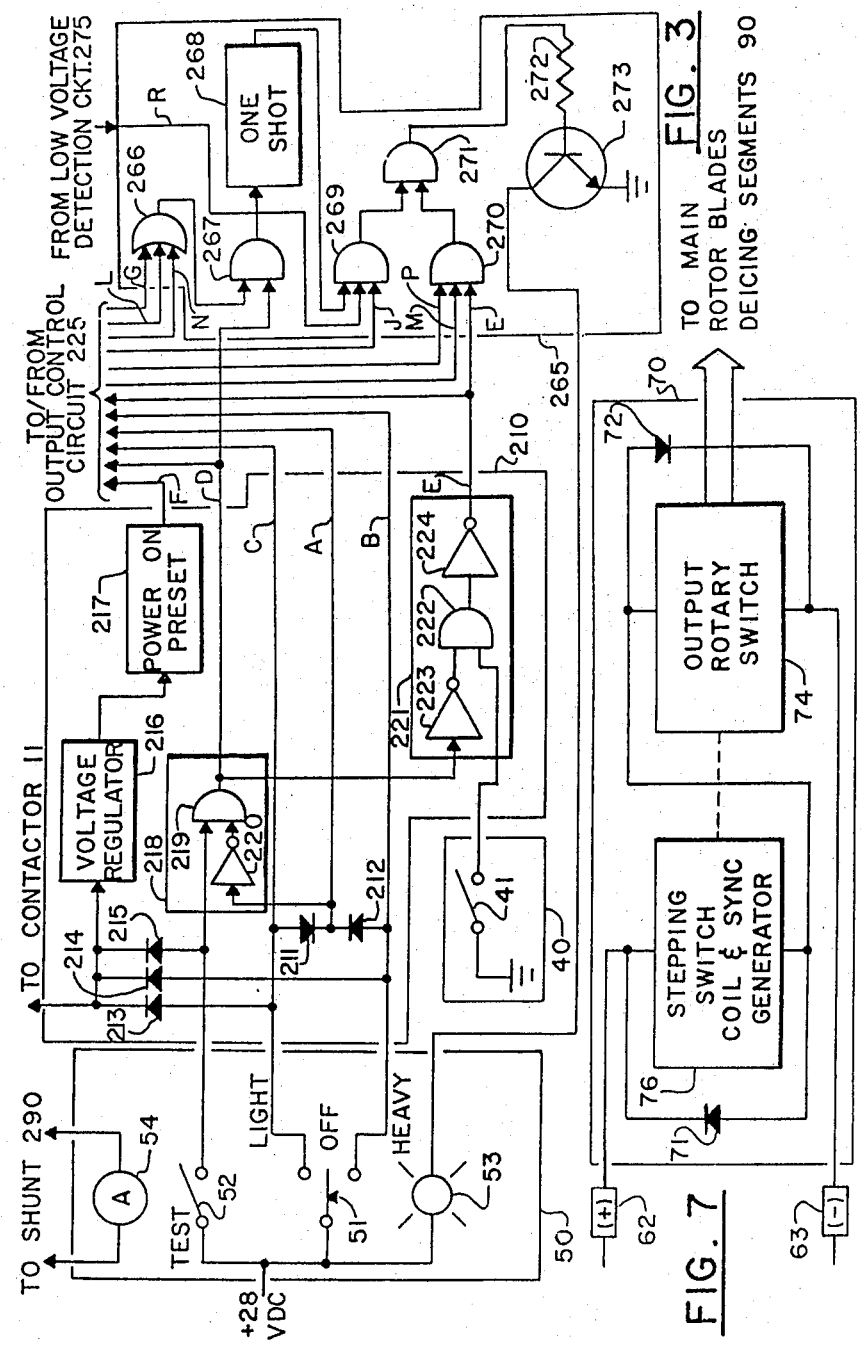
FIG. 3 is a schematic diagram of the rotor status sensor and a portion of the power distribution controller depicted in FIG. 2, including the controller power and input control circuit, and the test cycle indicator circuit.

FIG. 3 illustrates in generally schematic form the contents of rotor status sensor 40 and monitoring and control panel 50, which together control the activation of controller 20 in the desired mode of operation, controller power circuit 210 and test cycle indicator circuit 265. To prevent possible damage by overheating that might occur upon activation of the deicer system for other than brief testing purposes whenever the rotors are not turning, rotor status sensor 40 includes switch 41 to close only when the rotors are turning. Monitoring and control panel 50 includes a single-pole, three-position, center off, "on-off" switch 51 for activating the deicing system so as to provide for "light" or "heavy" deicing operation; a single-pole, momentary contact test switch 52; an indicator light 53; and an ammeter 54. One end of switch 52 and light 53, and the common terminal in switch 51 are connected to a control power source compatible with the operational voltages of controller 20, here 28 V.D.C. The "light" and "heavy" terminals of switch 51, which provide "light" and "heavy" deicing output signals "C" and "B" respectively, are connected to the anodes of blocking diodes 211 and 212 respectively, both of whose cathodes are connected together to provide an output signal, designated with the letter "A," whenever switch 51 is in either the "light" or "heavy" position, indicating the deicing system is "on."

The "light" and "heavy" terminals in switch 51 are also connected to the anodes of blocking diodes 213 and 214, respectively, while the output terminal of test switch 52 is connected to the anode of blocking diode 215. The cathodes of blocking diodes 213, 214, and 215 are joined together and connected to voltage regulator 216 and the coil in three phase power contactor 11, thereby insuring three phase power is received by controller 20 only during times controller 20 is in operation. The output of voltage regulator 216, supplying D.C. power necessary for the operation of controller 20, is received by power preset 217, which provides an output pulse signal, designated by the letter "F," for presetting the various timing circuits delineated below in output control circuit 225.

In addition to providing power and the above noted input control signals to controller 20, controller power circuit 210 also provides output signals designated by the letters "D" and "E," respectively, for indicating that a test cycle is to be conducted or that normal deicing system operation may proceed. Test logic circuit 218 includes two-input AND gate 219, which receives signal A (after inversion by inverter 220) as an input and as its other input is connected to the output terminal of test switch 52. Test logic circuit 218 provides signal D whenever the test switch is closed and the system is not in normal deicing operation. Output control logic circuit 221 includes two-input AND gate 222, which receives as an input the test signal D (after inversion by inverter 223) and as its other input is connected to the switch 41 terminal opposite the terminal which is connected to ground. Output control logic circuit 221 provides an output signal whenever the rotors are rotating for adequate cooling or the system is in a test cycle. The output signal from AND gate 222 is inverted by inverter 224 to obtain signal E, which has a logic convention required by other circuits within output control circuit 225.

Figure 4:
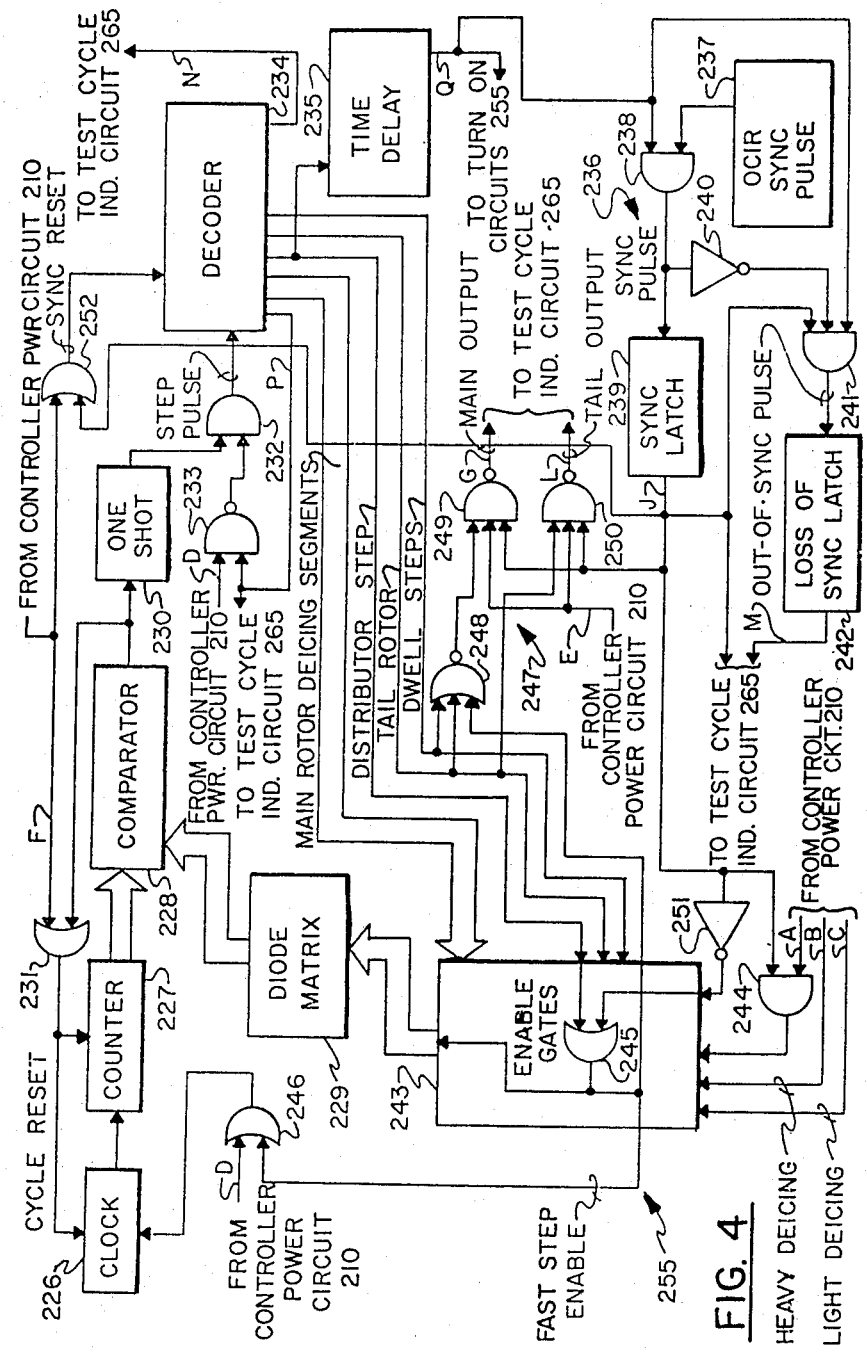
FIG. 4 is a further detailed block diagram of the timing and output control circuit depicted in FIG. 2, presenting various portions thereof schematically.

Output control circuit 225, depicted in further detail in FIG. 4, provides signals for properly sequencing the deicing segments, determining the time of each deicing cycle step, and insuring synchronization of main rotor distributor 70 with that of the rotor output circuit 285. In order to specify the operating frequency and information capacity of the various digital components in output control circuit 225, it first should be appreciated that device 10 permits preselection and variation of several of the individual timed events during the deicing cycle including the "on" time for each deicing segment (known as deicing segment energization time), the time for selection of the desired deicing segment (known as distributor step time), and the time between deicing segment energization cycles (known as "dwell" time). Thus, the various digital components in output controls circuit 225 should be selected with the desired maximum operational times in mind, but may have other suitable values.

The output of timing clock 226, which selectively provides a 10 Hz and a 40 Hz clock frequency as explained further hereinafter, is received by and continually increments a conventional counter 227 having a binary output and sufficient capacity to permit the maximum desired individual operational times explained above. In the present instance, with a normal operational clock frequency of 10 Hz, an 8 bit counter (permitting a maximum individual operational event time of 25.6 seconds ($2^8 \times 0.10$) has been found to be convenient. The binary output from couner 227 is received by a conventional comparator 228 of similar capacity (e.g., 8 bit) as that of counter 227 which continually compares the incoming count from counter 227 with that of diode matrix 229, whose output is also received by comparator 228. The output of comparator 228 is received by one shot 230 which generates a single pulse upon the detection of a count match by comparator 228.

The output of comparator 228 is also received by two-input OR gate 231. OR gate 231, which also receives the power on preset signal F from controller power circuit 210, resets clock 226 and counter 227 after each time comparator 228 detects a count match or controller 20 is initially turned "on." AND gate 232, which receives the output signal from both one-shot 230 and two-input NAND gate 223, acts as a disable gate, permitting decoder 234 to be incremented by one-shot 230, so long as the output signal from NAND gate 233 remains at the proper logic level, as will be detailed further hereinafter.

Decoder 234 may be a conventional decoder for sequentially selecting at least one of any sufficiently large number of output lines for each of the events that must be performed during a complete deicing cycle. In the present instance there exists 12 sets of main rotor deicing segments and one set of tail rotor deicing segments to be separately energized, 12 "steps" main rotor distributor 70 must make to individually address each of the 12 sets of main rotor deicing segments, and at least one "dwell" period, for a total of at least 26 output lines. It has been found convenient to gang four decade counters such as those commercially available from Motorola, Inc. of Chicago, Ill. with a Catalog No. MC14017B, to implement a 1 of 33 decoder and provide eight dwell period output lines.

Thus, the first 12 odd number output lines (i.e., line nos. 1, 3, 5, . . . 23) from 1 of 33 decoder 234 would sequentially go to a high logic level for separately delivering D.C. electrical power to each of the twelve sets of main rotor deicer segments, while alternately the first 12 even numbered output lines (i.e., line nos. 2, 4, 6 . . . 24) would sequentially go to a high logic level for providing deicing segment selection information and incrementing or "stepping" distributor 70 as discussed below. The twenty-fifth output line may be utilized to deliver D.C. electrical power to the tail rotor deicing segments and the output lines numbered 26 through 33, inclusive, utilized to provide the above noted dwell periods. Decoder 234 is reset by two-input OR gate 252 upon the occurrence of either sync latch signal J and power on preset signal F, both of which are received by OR gate 252.

Device 10 employs constant times between energization of sets of deicing segments and for all dwell periods. Accordingly, decoder 234 need only provide a single output line for all the "distributor step" output lines and a single output line for all the dwell period output lines. However, as will become more clear hereinafter, it is necessary to know when the dwell period begins and when it ends, the latter of which indicates the completion of a deicing cycle. Decoder 234, therefore, also separately furnishes output line numbers twenty-six and thirty-three, which go to a high logic level with the first and last dwell period, respectively. The output signals provided by these lines may be designated as "dwell step no. 1 signal N" and "cycle complete signal P," respectively.

Cycle complete signal P is received by two-input NAND gate 233 along with test cycle signal D so as to provide an enabling, high logic level signal to NAND 232 except when a deicing cycle is complete and a test cycle begun. The "distributor step" output lne is connected to time delay 235, which provides a distributor step command signal, designated by the letter "Q," having a pulse each time distributor 70 is to be incremented, suitably delayed to insure the proper operation of power silicon controller rectifier discussed below.

In order to insure the synchronized operation of all circuits in device 10 with that of distributor 70, a synchronization detector circuit, indicated generally by the numeral 236, is provided within output control circuit 225. In a manner explained in more detail hereinbelow, stepping switch synchronization and control circuit 295 provides a sync pulse when the appropriate output of decoder 234 concides with a preselected output from distributor 70. The sync pulse is optically coupled to sync detector circuit 236 by a conventional optical coupled isolator (hereinafter referred to as "OCI," and as OCIR and OCIT in the drawings for OCI receivers and transmitters, respectively) and received by OCI sync pulse receiver 237. The output of OCI sync pulse receiver 237 and distributor step command signal Q are received by two-input AND gate 238 which provides a sync pulse to both sync latch circuit 239 and, through inverter 240, to three-input AND gate 241. Three-input AND gate 241 also receives the output signal from sync latch 239, designated as sync latch signal "J," and distributor step command signal Q, and provides a loss-of-sync output signal to loss-of-sync latch 242, whose output may be referred to as loss-of-sync latch signal "M."

Diode matrix 229 may be a conventional line addressable diode switching matrix. Enable gates 243 receives: the sync latch signal J inverted through inverter 251; light and heavy deicing output signals C and B; a power-on and sync signal from two-input AND gate 244 (which receives "on" signal A and sync latch signal J); the twelve main rotor deicing segment output lines from decoder 234; and the single "distributor step", dwell steps and tail rotor deicing segment output lines from decoder 234. As long as device 10 is in sync, enable gates 243 selectively addresses the appropriate row in diode matrix 229 so that comparator 228 receives the appropriate binary number for the time desired to be spent in the event or step in which decoder 234 indicates device 10 is then operating. This is done by merely connecting each decoder output line through a sync enabling gate to the diode matrix row with the proper binary output code.

For example, utilizing a clock frequency of 10 Hz, assume that it is desirable to energize the first set of main rotor deicing segments for a period of one second. The first output line from decoder 234 is then connected along with that of sync latch signal J to a two-input NAND gate (not shown) whose output is connected to a diode matrix row providing the binary output code for the numeral ten. Once sync is achieved and maintained and the first output line from decoder 234 goes high (which shall provide power to the first set of main rotor deicing segments as noted below), it shall require ten clock pulses (or one second total) before comparator 228 determines a match count and activates one-shot 230 to increment the output of decoder 234 to the next output line. In this manner, the duration of each event in the deicing cycle may be adjustably preselected to best suit the deicing conditions and the particular aircraft with which device 10 is operated.

Many alternate implementation circuits and variations to output control circuit 225 will be evident to the skilled artisan and are intended to be within the spirit of the present invention. For example, it should be appreciated that in lieu of a diode matrix 229 and comparator 228, a programmable comparator, many of which are readily commercially available, and may be continuously varied by external parameters such as temperature or icing rate, is quite satisfactory for use herein. It should also be appreciated that various sets of event durations may be preselected and set into enable gates 243 and diode matrix 229. Again by way of example, it has been found possible to more readily dispose of varying thicknesses of ice by varying the dwell time. Accordingly, device 10 provides light and heavy deicing signals C and B to simply select between different preset dwell time durations.

In order to permit the rapid testing and synchronization of device 10, and the rapid sequencing of deicer segments, it is desirable to provide a second clock frequency greater than that utilized for normal deicing segment energization and dwell duration timing. A fast step enable signal is provided by two-input OR gate 245 which is included within enable gates 243. OR gate 245 receives the inverted sync latch signal from inverter 251 and the single distributor step signal from decoder 234 and furnishes an output whenever sync latch is lost or a distributor step signal received. The output signal from OR gate 245 is in turn received by frequency select two-input OR gate 246, which also receives test switch signal D. In this manner OR gate 246 provides an output to clock 226 directing it to provide a greater output frequency when testing is desired, or synchronization or sequencing of deicing segments must be achieved. Utilizing a clock frequency of 40 Hz, events may be timed in as little as 25 millisecond intervals.

Output control circuit 225 includes logic circuitry indicated generally by the numeral 247, for enabling delivery of D.C. power to the main and tail rotor deicing segments. The three-input NOR gate 248 receives the single dwell steps signal and tail rotor signal from decoder 234 and the fast step enable signal from fast step enable gate 245. The output of NOR gate 248, which is at a high logic level only in the absence of the single dwell steps signal, tail rotor signal and fast step enable signal, is received by three-input NAND gates 249 along with sync latch signal J and normal deicing system operation signal E. Thus, the output of NAND gate 249 goes to a low logic level only upon the simultaneous occurrence of a sync latch, a transfer of power or information to distributor 70, and normal deicing system operation. In a like manner, three-input NAND gate 250 receives sync latch signal J, normal deicing system operation signal E, and the tail rotor output line from decoder 234, so as to go to a low logic level only upon the simultaneous occurrence of a sync latch, a transfer of power to the tail rotor, and normal deicing system operation. The output signals from NAND gates 249 and 250 may be respectively designated as main rotor power output control signal "G" and tail rotor power output control signal "L."

Returning to FIG. 3, test cycle indicator circuit 265 is provided to give the aircraft pilot a visual indication that device 10 is operating properly. Signals G, L and N are received by three-input OR gate 266 whose output is received, along with test switch signal D, by two-input AND gate 267. The output of AND gate 267 is received by the triggers one-shot 268. The output signal from one-shot 268 is received by three-input AND gate 269, along with a low voltage signal "R" (whose generation is explained hereinbelow) and sync latch signal J. Signals E, M and P are received by three-input AND gate 270 whose output is received along with the output of AND gate 269, by two-input AND gate 271. The output of AND gate 271 is connected through resistor 272 to the base terminal of NPN switching transistor 273, whose emitter is connected to ground and whose collector is connected to the side of indicator lamp 53 opposite that connected to 28 V.D.C. Resistor 272 is selected such that when the output from AND gate 271 is at a low logic level, transistor 273 is in cutoff, and when the output from AND gate 271 is at a high logic level transistor 273 is in saturation, effectively connecting the collector to ground and turning on indicator lamp 53.

By selecting the output logic level of one-shot 268 such that it continually enables AND gate 269 at all times except when an output is received from AND gate 267, both AND gates 269 and 270 will permit AND gate 271 to place transistor 273 in saturation and turn on, and continuously leave on, indicator lamp 53 for as long as device 10 is in sync, operating normally, and a main or tail rotor output signal or dwell steps output signal is present. When test cycle signal D is present, one-shot 268 will permit AND gate 269 to turn on only for each main and tail rotor segment energization and for the entire dwell time, ultimately toggling indicator light 53 on and off fourteen times in each deicing cycle (twelve times for the main rotor deicing segments, once for the tail rotor deicing segments, and once for the entire dwell time). Therefore, by periodically monitoring indicator light 53 during operation and testing, a pilot may quickly and easily confirm that the deicing control system is operating properly.

Figure 5:
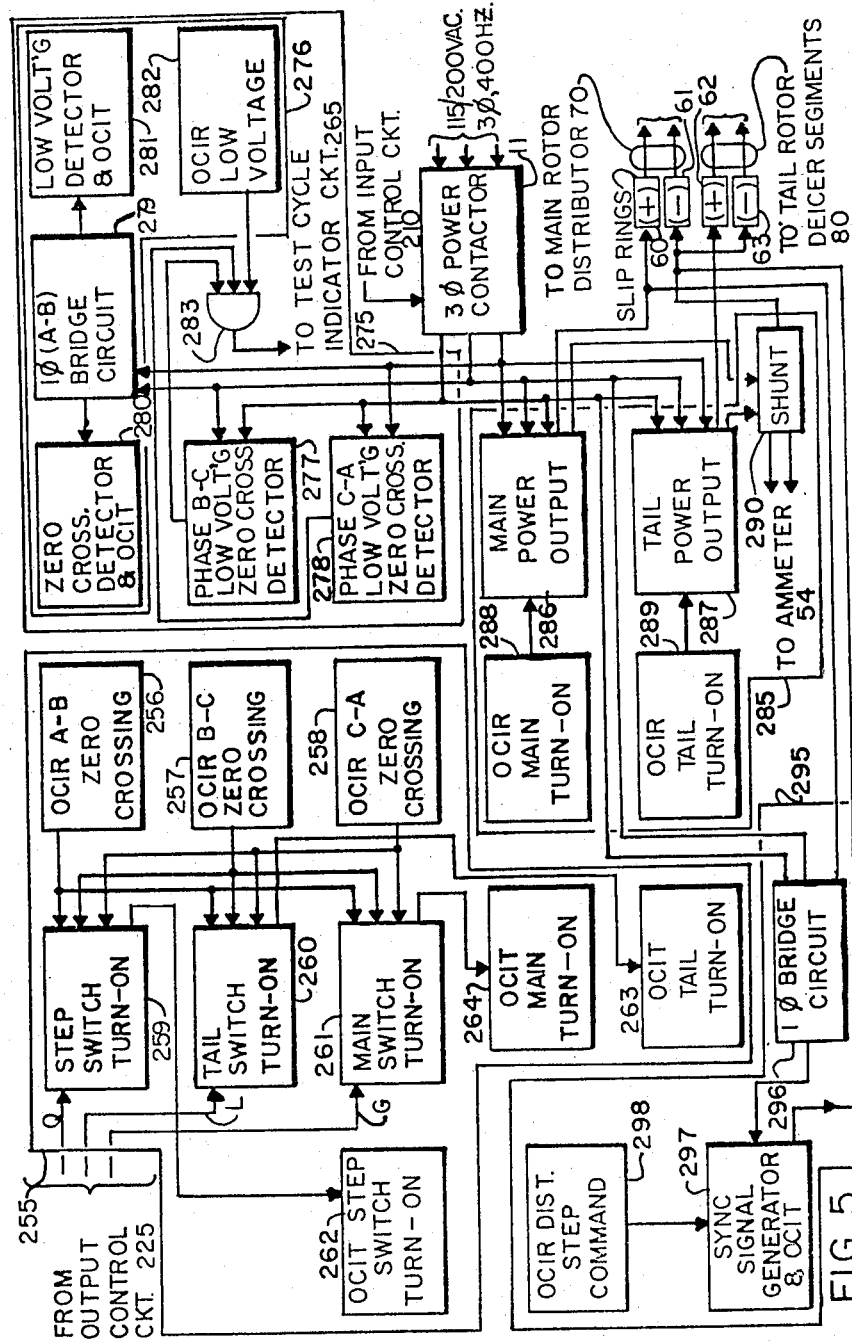
FIG. 5 is a further detailed block diagram of various other portions of the power distribution controller depicted in FIG. 2, including the turn-on circuits, the low voltage and zero crossing detection circuits, the main and tail rotor output circuit, and the stepping switch synchronization and control circuit.

The portions of output control circuit 225 whose structure remains to be described may be seen in more detailed block form in FIG. 5. In order to convert the 120/200 V.A.C., three phase, onboard helicopter supply voltage to a D.C. signal of suitable voltage for deicing segments 80 and 90, it is necessary to rectify the AC signal. In order to minimize the possibility of mechanical failure, device 10 employs a three phase silicon controlled rectification circuit utilizing the well-known zero crossover switching technique in which the silicon controlled rectifiers (SCRs) are switched when the appropriate phase voltage signals cross zero. Detection circuits 275 detect not only the zero crossing time for each phase, but also determine when the power system voltage is too low for proper operation of deicing segments 80 and 90.

Low voltage and zero crossing detection circuits 275 includes three identical circuits 276, 277 and 278 for the detection of low voltage and the zero crossing for phases A-B, B-C and C-A, respectively. As seen in the only detailed circuit, 276, a single phase bridge circuit 279 receives the appropriate two phase signals from three phase power contactor, 210, in this instance phases A and B. The output of single phase bridge circuit 279 is received by both the zero crossing detector 280 and low voltage detector 281. Zero crossing detector 280 may be any of the numerous well-known zero crossing detection circuits as would occur to one skilled in the art and may include a conventional OCI transmitter to minimize interference in the control signal. Low voltage detector 281 may by any of the numerous well-known low voltage detection circuits, such as those with a zener diode, or as would occur to one skilled in the art and may include a conventional OCI transmitter to minimize interference in thecontrol signal. A low voltage OCI receiver 282 is provided and has its output received by a three-input AND gate 283 which also receives the similar outputs from low voltage detectors 277 and 278. Upon the detection of low voltage in any phase, AND gate 283 provides a high logic level signal, which may be referred to as low voltage signal "R", to AND gate 269 (FIG. 3) in test cycle indicator 265 for visual alarm as previously denoted.

Three zero crossing OCI receivers 256, 257and 258 are provided in turn-on circuits 255. The output signals from zero crossing OCI receivers 256, 257 and 258 are all received by distributor step switch turn-on circuit 259, tail rotor deicing segment switch turn-on circuit 260, and main rotor deicing segment switch turn-on circuit 261, which switch turn-on circuits also respectively receive signals Q, L and G from output control circuit 225. Upon receipt of both the appropriate zero crossing signals from zero crossing OCI receivers 256, 257 and 258, and of the respective signals Q, L or G, turn-on circuits 259, 260 and 261 provide output signals for activating the main and tail rotor output circuits 285 and sync circuit 295. The output signals from turn-on circuits 259, 260 and 261 may be received by three conventional OCI transmitters 262, 263 and 264 respectively to minimized interference in the control signal.

Main and tail rotor output circuit 285 includes separate main and tail power output SCR rectification circuits 286 and 287, main and tail rotor output circuit OCI receivers 288 and 289 and an ammeter shunt 290. Both main and tail power output SCR rectification circuits 286 and 287 receive the three phase electrical power output from the three phase power contactor 11 and the output signals from main and tail rotor output circuit OCI receivers 288 and 289, respectively.

Upon receipt of a turn-on signal, the associated power output circuit provides D.C. electrical power of suitable voltage to the appropriate slip-ring assemblies. Main power output circuit 286 provides a nominally positive signal to main rotor slip-ring assembly 60 and provides a nominally negative signal through shunt 290 (which is connected to and of suitable current capacity for ammeter 54), to main rotor slip-ring assembly 60. Tail power output circuit 287 provides a nominally positive signal to tail rotor slip-ring assembly 62, and provides a nominally negative signal through shunt 290 to tail rotor slip-ring assembly 63 which is connected to nominally negative main rotor slip-ring assembly 61.

Sync circuit 295 includes a single phase bridge circuit 296, a sync signal generator and OCI transmitter 297, and an OCI receiver 298 for receiving the distributor step switch turn-on signal from OCI transmitter 262. Single phase bridge circuit 296 receives two phases from three phase power contactor 11 and has its nominally negative voltage polarity terminal connected to nominally positive voltage main rotors slip-ring assembly 60. The rectified output from single phase bridge circuit 296 and the output signal from OCI receiver 298 are received by sync signal generator and OCI transmitter 297. Sync signal generator and OCI transmitter 297, which is connected to the positive voltage terminal of single phase bridge circuit 296, has its output connected to the nominally negative voltage polarity main rotor slip-ring assembly 61.

As shall become more evident hereinafter, during such time that D.C. electrical power is being transferred to main rotor distributor 70, main rotor slip-ring assemblies 60 and 61 possess the nominal voltage polarity indicated in FIG. 5. However, during such time that sync is to be achieved or main rotor distributor 70 to be instructed to select the next set of deicing segments to be energized, main rotor slip-ring assemblies 60 and 61 possess a voltage polarity opposite that indicated in FIG. 5. It is this transmission of power and information with reversed polarity between which distributor 70 can distinguish that, in a manner to be explained below, permits the selective control of a plurality of separate deicing segments.

As shown in FIG. 6, distributor 70, which rotates with and is mounted upon the main rotor drive shaft, includes two diodes 71 and 72, and two multiple position rotary switches—stepping switch sync generator 73 and output rotary switch 74, both of which are simultaneously rotated by a single rotary or steppingswitch coil 75. In practice, the two rotary switches 73 and 74 may be a single rotary switch with a single stepping switch coil 75 and two ganged switching decks. Each deck should have at least the same number of separate load terminals as the number of sets of deicing segments to be separately energized on the rotor with the distributor. In the embodiment described herein, there exist twelve sets of main rotor deicing segments, and so both decks for stepping switch stepping sync generator 73 and output rotary switch 74 may have twelve terminals.

Each output terminal of output rotary switch 74 is connected to the desired set of main rotor deicing segments 90, which includes six deicing segments 90A through 90F, inclusive, on one main rotor blade, and deicing segments 90G, 90H and through 90M, inclusive, on the opposite main rotor blade. For example, deicing segments 90A and 90G are connected in parallel, one end of which is connected to the first terminal in output rotary switch signal 74, and the other end of which is connected to a common terminal to which all deicing segments are connected. In a similar manner, deicing segments 90B and 90H are connected to a second terminal in output rotary switch 74, and those deicing segments that remain (including those on main rotor blade numbers 3 and 4 which are not shown) sequentially connected to the remaining ten terminals in output rotary switch 74. Of course, it should be appreciated that although output rotary switch 74 will sequentially engage and distribute power through each of its terminals, it is possible to obtain whatever order of deicing segment energizations is desired by merely connecting such segments to the various terminals on output rotary switch 74 in the appropriate order.

Returning to distributor 70, main rotor slip-ring assembly 60 is connected to output rotary switch 74 and the cathode of diode 71, while the anode of diode 71 is connected to both stepping switch coil 75 and stepping switch sync generator 73. Main rotor slip-ring assembly 61 is connected to stepping switch coil 75, stepping switch sync generator 73, and the cathode of diode 72, while the anode of diode 72 is connected to output rotary switch 74.

By connecting diodes 71 and 72 in the above manner, stepping switch coil 75 and stepping switch sync generator 73 are in series with diode 71, and output rotary switch 74 is in series with diode 72, whose opposite polarity connection will permit conduction only when diode 71 is not conducting. Therefore, by providing a signal to main rotor slip-ring assemblies 60 and 61 with the nominal polarity voltage indicated, stepping switch coil 75 and stepping switch sync generator 73 will not be activated but D.C. electrical power will be then distributed to the last terminal to which output rotary switch 74 was set. Conversely, when a signal is provided to main rotor slip-rings assemblies 60 and 61 with a polarity voltage opposite the nominal polarity voltage, stepping switch coil 75 will advance both stepping switch sync generator 73 and output rotary switch 74 to the next deck terminal.

Although any number of preselected rotary switch deck terminals may be utilized to obtain and/or maintain synchronization by suitable modification of sync circuit 236, stepping switch signal generator 73 is illustrated with only a single preselected rotary switch deck terminal connected to main rotor slip-ring assembly 61. When stepping switch coil 75 increments this rotary switch to where its common terminal engages the single preselected deck terminal, a sync signal will be generated until stepping switch generator 73 is next incremented. The generated sync pulse will be transmitted via main rotor slip-rings assemblies 60 and 61 to sync circuit 295 for relaying to synchronization detector circuit 236 as explained above.

FIG. 7 illustrates an alternate distributor 70 suitable for use herein in which diodes 71 and 72 are in parallel with stepping switch coil and stepping switch sync generator (depicted as a single box with numeral 76), and output rotary switch 74, respectively. This parallel arrangement effectively operates identically to that of the series arrangement depicted in FIG. 6. It should also be appreciated that simultaneous control of and distribution to a plurality of load networks may be achieved by cascading a suitable number of either the parallel or series arranged distributors 70. Moreover distributor 70 may be implemented with entirely solid state circuitry.

Having described the construction of deicing control device 10, a typical operational sequence may now be detailed. A normal deicing cycle is begun with the pilot activating "on-off" switch 51 by placing it in the desired position for either "light" or "heavy" deicing operation. For purposes of illustration, "light" deicing operation shall be selected. Assuming the rotors are turning so that switch 41 is closed, controller power circuit 210 immediately provides "on" signal A, "light" deicing signal C, normal deicing system operation signal E, and power on preset signal F which resets clock 226, counter 227 and decoder 234, all as explained above.

Because upon initial turn-on no sync will have been established, synchronization detector circuit 236 will inhibit enable gates 243 with the exception of fast step enable gate 245, which gate will enable clock 226 to begin operation at the greater of its two frequencies, 40 Hz herein. Clock 226 will increment counter 227 for two clock pulses, at which time comparator 228 will detect a count match with the output binary code from diode matrix 229 selected by fast step enable gate 245. Comparator 228 next activates one-shot 230 whose output furnishes a step pulse to decoder 234 for incrementing the same and resetting clock 226 and counter 227. If the output of decoder 234 is anything other than a distributor step signal, nothing else occurs, since all enable gates 243 other than the fast step enable gate 245 are still disabled.

In the meantime clock 226 and counter 227 will begin a new count cycle which eventually increments decoder 234 until a distributor step signal is provided. The distributor step signal, delayed by time delay 235, is received by step switch turn-on circuit 259, which in turn and upon the next appropriate power supply phase zero crossings, activates distributor step command OCI receiver 298 in stepping switch sync and control circuit 295. Distributor step command OCI receiver 298 causes sync signal generator 297 to generate an output pulse to main rotor slip-ring assemblies 60 and 61 with a voltage polarity opposite the nominal polarity indicated in FIG. 5. As explained above, such a signal causes stepping switch coil 75 to increment the decks in a stepping switch sync generator 73 and output rotary switch 74, but precludes the transmission of any electrical power to main rotor deicing segments 90.

If the next rotary switch deck position and stepping switch sync generator 73 is not the preselected sync terminal, no sync pulse is generated and comparator 228 will reach a match count and reset clock 226 and counter 227 as noted above, restarting the process again. Once the preselected sync terminal is reached, the contact closure in stepping switch sync generator 73 alters the impedance seen by sync generator 297 such that it generates an optical sync pulse, which is in turn received by sync pulse OCI receiver 237. When decoder 234 reaches this distributor step output signal, AND gate 238 resets sync latch 239, thereby enabling AND gate 241, enable gate 243 and returning clock 226 to its lower operational frequency, 10 Hz herein. Device 10 then may be said to be in sync. If for any reason sync is lost during operation, a similar process may again begin and re-establish synchronization.

Where the preselected sync terminal and stepping switch sync generator 73 corresponds to the terminal in output rotary switch 74 connected to the set of main rotor deicing segments 90 desired to be first energized, device 10 is ready to begin a normal deicing cycle as soon as sync is achieved. As a result, initial generation of sync latch signal J may be designed to activate sync reset gate 252 so as to reset decoder 234 to its first main rotor deicing segment energization output (the first output line), providing main output signal G to main rotor deicing segment turn-on circuit 261. Upon the next appropriate power supply phase zero crossings, main rotor deicing segment turn-on circuit 261 activates main power output circuit 286 via OCI 264 and 288. When comparator 228 detects a match count between counter 227 and the binary number from diode matrix 229, decoder 234 is incremented to the second main rotor deicing segment output line as explained above. In a similar manner, output control circuit 225 sequences through the remaining twelve sets of main rotor deicing segments, alternated with the twelve distributor steps for incrementing the rotary switch in distributor 70, the single tail rotor deicing segment step, and the eight dwell steps.

Figures 8, 9:
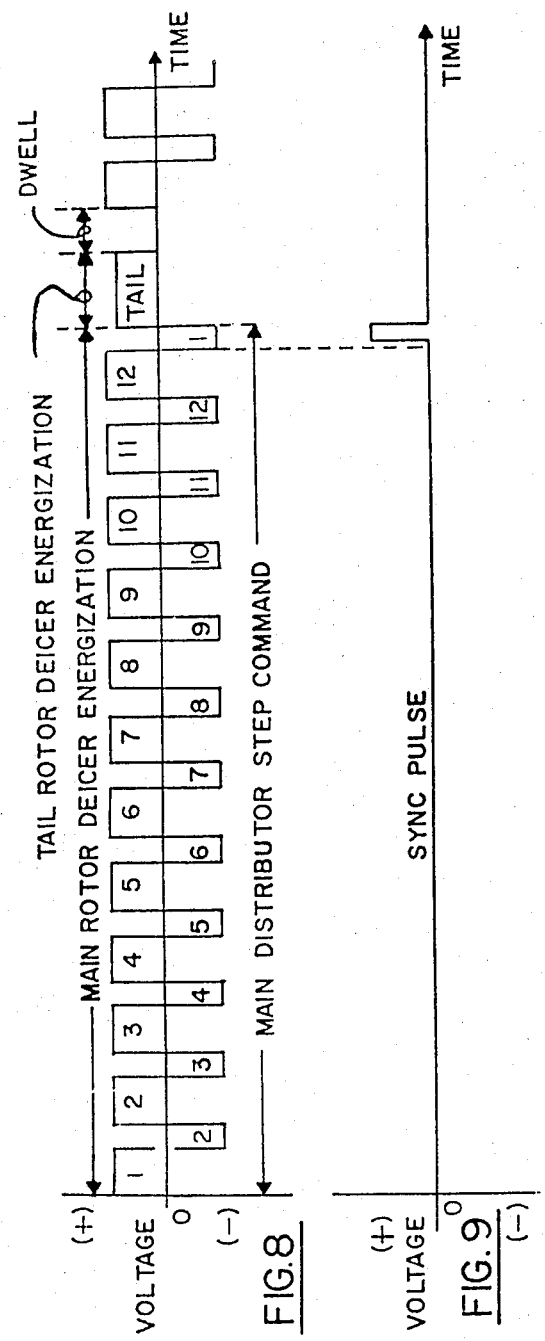
FIG. 8 is a somewhat schematic representation of the voltage waveform at the main rotor slip-rings.
FIG. 9 is a somewhat schematic representation of the sync pulse generated by the stepping switch synchronization and control circuit.
Figures 8, 9:
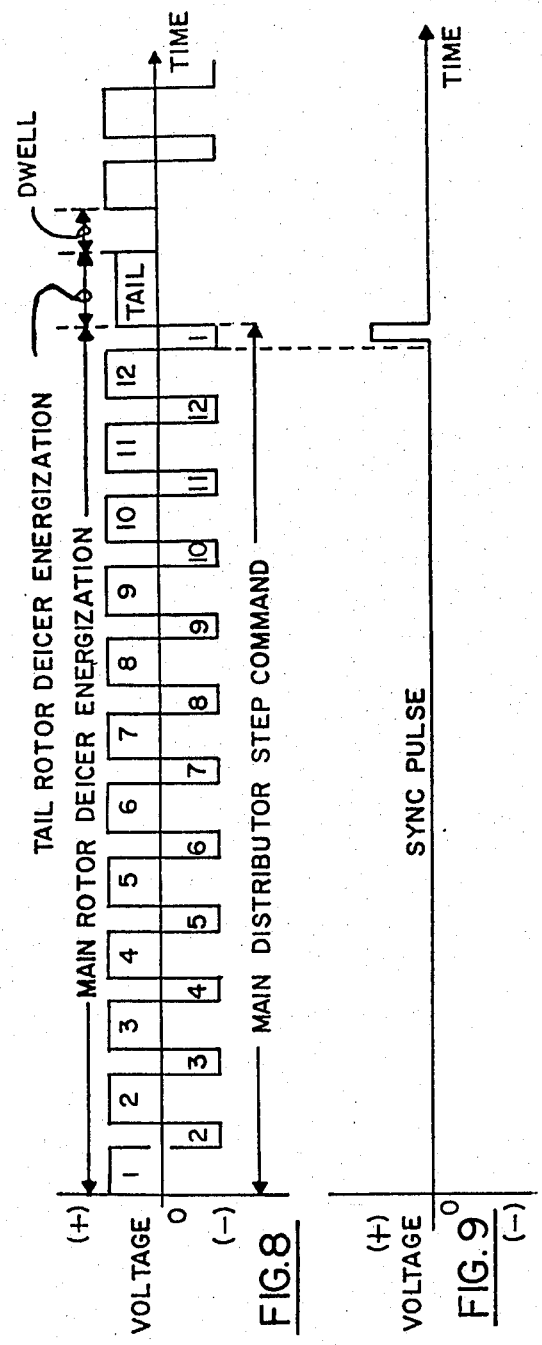

FIG. 8 illustrates, although not necessarily to scale or coordinated in time, the voltage wave form at the rotor slip-ring assemblies throughout a normal deicing operational cycle. The "pulses" which energizes the deicing segments are depicted as having a "positive" voltage polarity (measuring the voltage at slip-ring assembly 60 or 62 relative to that at slip-ring assembly 61 or 63) and are sequentially numbered (the "tail" energization pulse is identified as such). The "pulses" which cause the rotary switch within distributor 70 to increment are depicted as having a "negative" voltage polarity (using the same measurement convention) and are also sequentially numbered with the first distributor step command pulse occurring at the time of synchronization depicted as immediately preceeding the tail rotor deicing segment energization pulse.

FIG. 9, which is coordinated in time with FIG. 8 although not necessarily to scale, depicts the sync pulse generated by sync signal generator 297. The leading edge of the sync pulse is displaced slightly behind the leading edge of the distributor step pulse numbered "1" because of the attendant delays in electromechanical distributor 70 and in generating the sync pulse after incrementation of distributor 70 by the distributor step pulse numbered "1".

The pilot may test deicing control device 10 at any time the device 10 is not in a normal deicing cycle, whether the rotors are turning for sufficient cooling or not, by simply closing test switch 52. As discussed hereinabove, assuming a test is desired when the rotors are stationary, controller power circuit 210 then provides test switch signal D which causes clock 226 to operate at its higher frequency, 40 Hz herein. Output control circuit 225 will then rapidly sequence through a single, complete deicing test cycle. Upon the completion of the last dwell period in the deicing cycle, the cycle complete signal input to NAND gate 233 goes to a high logic level and, since NAND gate 233 also receives test signal D which is also at a high logic level, gate 233 disables gate 232 and inhibits transmission of any further step pulses to decoder 234, thereby terminating the single test cycle.

Two types of devices for the visual monitoring of deicing system operation are provided in deicing control device 10: a visual indicator light 53, whose operation has been explained above, and an ammeter 54. Ammeter 54, as a result of its connection to shunt 290 that is in series between main and tail power output circuits 286 and 287 and the rotor slip-ring assemblies will indicate the current magnitude of all D.C. electrical power distribution signals to distributor 70 for the energization of rotor deicing segments 80 and 90. Thus, ammeter 54 will toggle between readings of zero and the rotor power distribution current for that portion of the deicing cycle during which the rotor deicing segments 80 or 90 are energized.

It should be appreciated that deicing system 10 may be modified, to selectively control, within the limits of available power, any number of individual load elements upon any number of separately rotating surfaces. To accomplish this, a suitable number of distributors similar to distributor 70 may be provided for utilization with a suitably modified deicing control device 10. For example, if the tail rotor had a plurality of deicing segments to be selectively activated, a distributor may be placed on the tail rotor drive shaft and power distribution controller 20 modified to contain a decoder of greater capacity (or a second decoder addressable by the first decoder).

It should also be noted that in describing the construction and operation of the logic elements within deicing control device 10, the so-called "positive true logic" convention has been adopted. As would be recognized by a skilled artisan, any other circuits employing a similar or different logic convention could be utilized to implement the desired functions, and when so utilized clearly fall within the scope of the present invention.

Although in the preferred embodiment a voltage polarity parameter was utilized by distributor 70 to distinguish between deicing segment selection information and deicing segment power, such a parameter is only representative of many types of permissible parameters suitable for carrying out the concept of the present invention. For example, the concept of the present invention could be implemented using absolute voltage magnitude (whether the load requires a DC or AC power signal), and, where the load elements require an AC signal, phase or frequency differences could be utilized by the distributor to differentiate between the control and power signals.

Inasmuch as the present invention is subject to many variations, modifications, and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of controlling an aircraft deicing system.

What is claimed is:

1. A device for selectively distributing electrical power to a plurality of load elements on at least one rotating member comprising:
   a source of electrical power;

controller means connected to said source of electrical power and providing an output signal having an electrical parameter variable between at least two distinguishable states, a first control state for selecting which of the load elements is to next receive power and a second power state for distributing electrical power to whichever load element is selected; and, distributor means rotating with the rotating member for receiving said output signal from said controller means, said distributor means switching upon receipt of said output signal in said first control state to the load element to next receive power, and distributing electrical power only upon receipt of said output signal in said second power state to whichever load element is selected.

2. A device, as recited in claim 1, further including signal transfer means for conducting said output signal from said controller means into said distributor means.

3. A device, as recited in claim 2, wherein said signal transfer means consists of two signal transfer assemblies for each said distributor means.

4. A device, as recited in claim 3, further including means for activating said controller means in the desired mode of operation and providing at least one output signal indicative thereof, and wherein said controller means includes controller power circuit means receiving the output signal from said means for activating said controller means and providing a plurality of output signals for controlling the operation of said controller means, output control circuit means receiving at least one of said output signals from said controller power circuit means and providing a plurality of output signals for controlling the time at which said controller means provides said output signal to said distributor means and the duration of each said distinguishable state in said output signal, and output circuit means receiving both the electrical power from said source and at least one of said plurality of output signals from said output control circuit means and providing an output signal having an electrical parameter in said first control state for directing said distributor means to select a desired load element, and an electrical parameter in said second power state for directing said distributor means to distribute the electrical power to the selected desired load element, said distributor means receiving said output signal from said output circuit means through said two signal transfer assemblies.

5. A device, as recited in claim 3 or 4, wherein the electrical power to be distributed to the plurality of load elements is direct current, said electrical parameter is voltage polarity, and said distributor means includes at least two diodes in opposite conductive arrangement so as to prohibit the selection of the desired load element when said output signal from said output circuit means has a first polarity and to prohibit the distribution of D.C. electrical power to the desired load element when said output signal from said output circuit means has an opposite polarity.

6. A device, as recited in claim 5, wherein said controller means further includes means for continuously visually monitoring the operational status of the device.

7. A device for sequentially distributing D.C. electrical power to a plurality of load elements on at least one rotating member comprising:

a source of electrical power;

controller means connected to said source of electrical power and providing an output signal including a D.C. electrical control signal of a fixed polarity for selecting which of the load elements is to next receive power and a D.C. electrical power signal of a fixed polarity opposite that of said D.C. electrical control signal for distributing electrical power to whichever load element is selected;

distributor means rotating with the rotating member for receiving said output signal from said controller means, said distributor means switching upon receipt of said D.C. electrical control signal to the load element to next receive power, and distributing D.C. electrical power only upon receipt of said D.C. electrical power signal to whichever load element is selected; and, signal transfer means for conducting said output signal from said controller means into said distributor means.

8. A device, as recited in claim 7, wherein said signal transfer means consists of two signal transfer assemblies for each said distributor means.

9. A device, as recited in claim 8, further including means for activating said controller means in the desired mode of operation and providing at least one output signal indicative thereof, and wherein said controller means includes controller power circuit means receiving the output signal from said means for activating said controller means and providing a plurality of output signals for controlling the operation of said controller means, output control circuit means receiving at least one of said output signals from said controller power circuit means and providing a plurality of output signals for controlling the time at which said controller means provides said output signal to said distributor means and the duration of said D.C. electrical control signal and said D.C. electrical power signal, output circuit means receiving both the electrical power from said source and at least one of said plurality of said output signals from said control circuit means and providing at least that portion of said controller output signal including said D.C. electrical power signal, and sync circuit means receiving at least a portion of both the electrical power from said source and at least one of said plurality of said output signals from said output control circuit means and providing at least that portion of said controller output signal including said D.C. electrical control signal, said distributor means receiving both said D.C. electrical power signal and said D.C. electrical control signal through said two signal transfer assemblies.

10. A device, as recited in claim 9, wherein said output control circuit means includes logic means for individually selecting the time each said load element is to receive the D.C. electrical power.

11. A device, as recited in claim 10, wherein said distributor means includes at least two diodes and rotary switch means having a plurality of load contacts connected to the plurality of load elements and a single, common contact for sequentially engaging each said plurality of contacts, said diodes connected in opposite conductive arrangement so as to prohibit the incrementation of said rotary switch means when said D.C. electrical power signal is received, and to prohibit the distribution of D.C. electrical power to the load element connected to said rotary switch means contact presently engaged with said common contact when said D.C. electrical control signal is received.

12. A device, as recited in claim 11, wherein said rotary switch means further includes sync generator means for permitting the generation of a sync signal by said sync circuit means when at least one particular preselected said load contact engages said common contact and when said D.C. electrical control signal is being received by said distributor means.

13. A device, as recited in claim 12, wherein said rotary switch means further includes a stepping coil and at least two multiple contact rotary switch decks, one of said diodes being connected in series with said stepping coil and at least one of said rotary switch decks, and the other of said diodes being connected in series with at least another of said rotary switch decks.

14. A device, as recited in claim 12, wherein said rotary switch means further includes a stepping coil and at least two multiple contact rotary switch decks, one of said diodes being connected in parallel with said stepping coil and at least one of said rotary switch decks, and the other of said diodes being connected in parallel with at least another of said rotary switch decks.

15. A device, as recited in claims 13 or 14, wherein said means for activating said controller means in the desired mode of operation includes test cycle switch means, and said controller power circuit means includes logic means for rapidly testing the operation of the device while the rotating member is stationary.

16. A device, as recited in claim 15, wherein said output control circuit means further includes logic means for permitting the rapid incrementation of said rotary switch means during both normal operational cycle and testing.

17. A device, as recited in claim 16, wherein the load elements are deicing segments associated with at least one of an aircraft's rotating surface, said controller means is fixed aboard said aircraft, said distributor means rotates in associated with at least one of said aircraft's rotating surfaces, and said signal transfer assemblies are slip-ring assemblies in part mounted upon the drive shaft for said rotating surfaces.

* * * * *